United States Patent [19]
Hoell

[11] Patent Number: 5,988,498
[45] Date of Patent: Nov. 23, 1999

[54] METHOD OF DELAYING AVAILABILITY OF PRICE CHANGES TO CHECKOUT TERMINALS FOLLOWING EPL PRICE CHANGES

[75] Inventor: Eric W. Hoell, Suwanee, Ga.

[73] Assignee: NCR Corporation, Dayton, Ohio

[21] Appl. No.: 08/882,706

[22] Filed: Jun. 25, 1997

[51] Int. Cl.$^6$ .................................................. G06K 15/00
[52] U.S. Cl. ......................... 235/383; 235/377; 235/474; 340/825.35; 705/20
[58] Field of Search .................................... 235/383, 377, 235/378, 381, 385, 474; 340/825.49, 825.55, 825.35; 705/20, 5, 16, 23, 26, 14

[56] References Cited

U.S. PATENT DOCUMENTS

| | | | |
|---|---|---|---|
| 4,002,886 | 1/1977 | Sundelin | 235/61.7 R |
| 4,500,880 | 2/1985 | Gomersall et al. | 340/825.35 |
| 4,766,295 | 8/1988 | Davis et al. | 235/383 |
| 4,888,709 | 12/1989 | Revesz et al. | 340/825.07 |
| 4,924,363 | 5/1990 | Kornelson | 362/125 |
| 5,072,381 | 12/1991 | Richardson et al. | 364/410 |
| 5,172,314 | 12/1992 | Poland et al. | 364/401 |
| 5,198,644 | 3/1993 | Pfeiffer et al. | 235/383 |
| 5,241,467 | 8/1993 | Failing et al. | 235/383 X |
| 5,260,936 | 11/1993 | Bardet et al. | 370/61 |
| 5,448,226 | 9/1995 | Failing, Jr. et al. | 340/825.35 |
| 5,461,561 | 10/1995 | Ackerman et al. | 364/401 |
| 5,493,107 | 2/1996 | Gupta et al. | 235/383 |
| 5,526,267 | 6/1996 | Sogawa | 364/431.11 |
| 5,537,126 | 7/1996 | Kayser et al. | 345/1 |
| 5,539,393 | 7/1996 | Barfod | 340/825.52 |
| 5,572,653 | 11/1996 | DeTemple et al. | 395/501 |
| 5,694,418 | 12/1997 | Goodwin, III | 375/219 |
| 5,753,900 | 5/1998 | Goodwin, III et al. | 235/383 |
| 5,794,211 | 8/1998 | Goodwin, III et al. | 705/23 |
| 5,794,215 | 8/1998 | Goodwin, III | 235/383 X |
| 5,797,131 | 8/1998 | Goodwin, III et al. | 705/16 |
| 5,870,714 | 2/1999 | Shetty et al. | 705/20 |

*Primary Examiner*—Michael G. Lee
*Attorney, Agent, or Firm*—Paul W. Martin

[57] ABSTRACT

A system and method of delaying availability of a price change to checkout terminals following a change in price displayed by an electronic price label (EPL) which minimizes server overhead required to change prices. The method includes the steps of storing a first time associated with the change in price displayed by the EPL, providing a price change file for changing the first price to the second price and containing a delay period, reading the price change file to obtain the delay period, determining whether a current time is later than the first time plus the delay period, and executing the price change file if the current time is later than the first time plus the delay period to replace the first price with the second price.

8 Claims, 2 Drawing Sheets

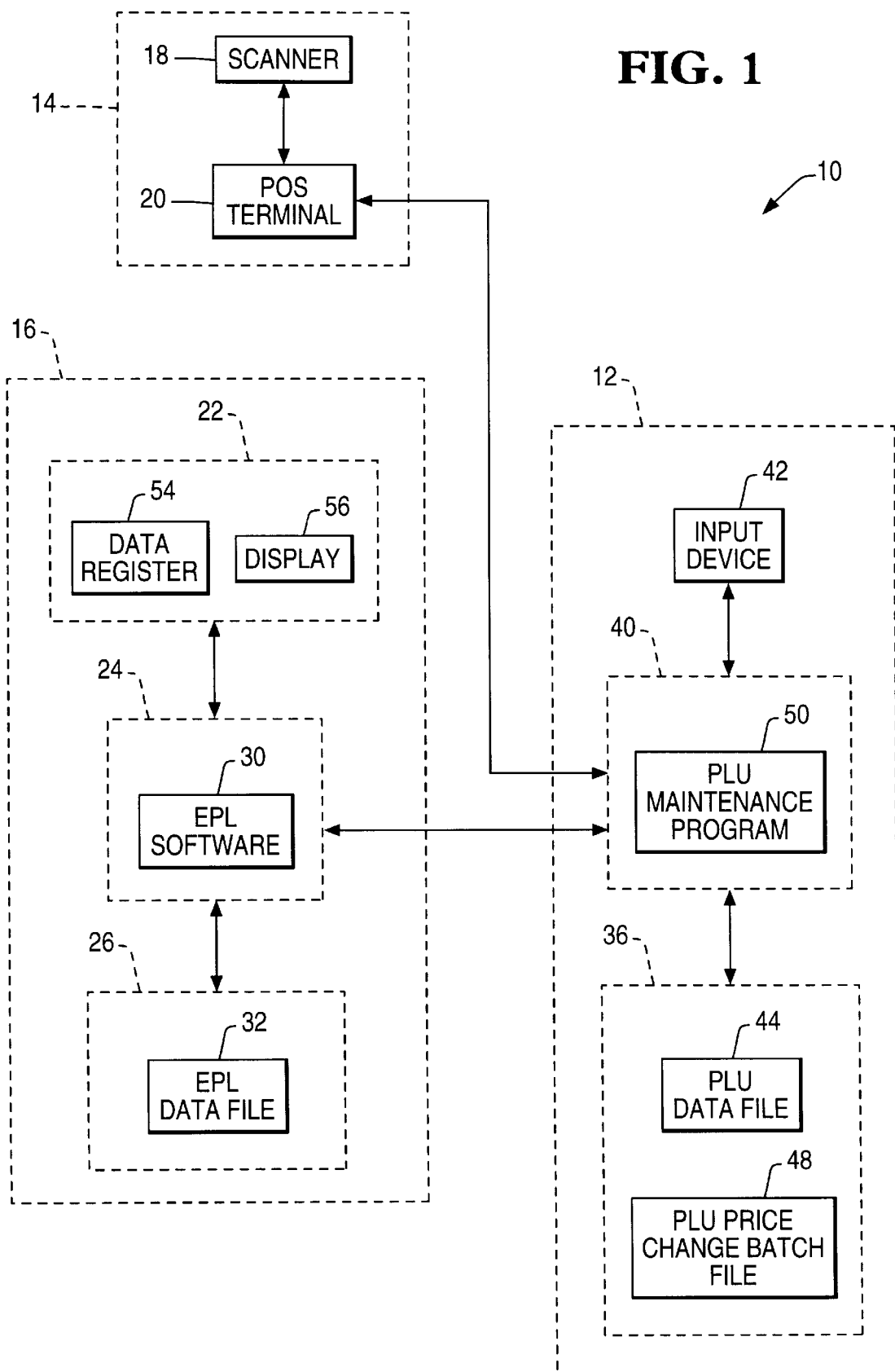

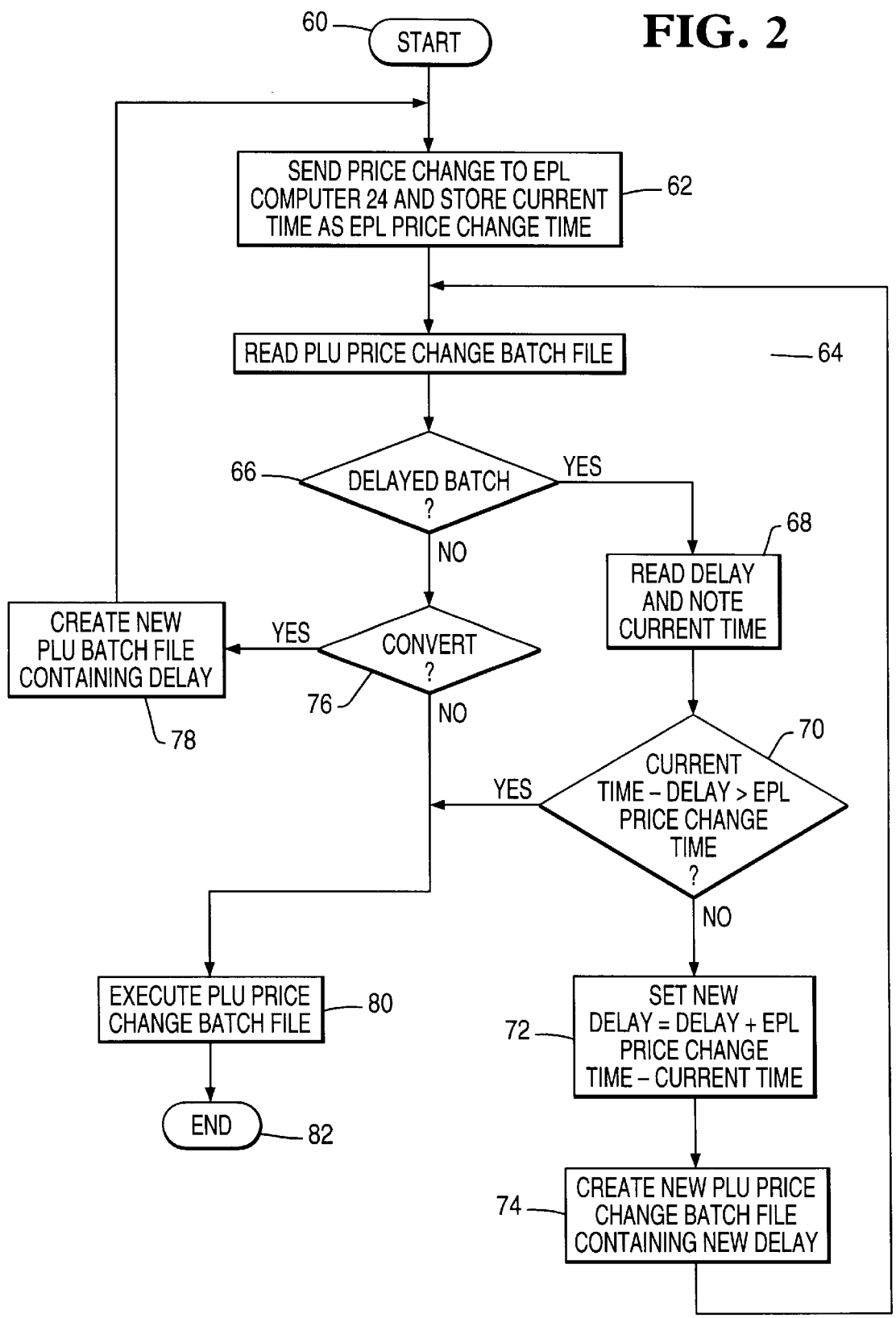

METHOD OF DELAYING AVAILABILITY OF PRICE CHANGES TO CHECKOUT TERMINALS FOLLOWING EPL PRICE CHANGES

BACKGROUND OF THE INVENTION

The present invention relates to electronic price label (EPL) systems, and more specifically to a method of delaying availability of price changes to checkout terminals following EPL price changes.

In a traditional retail store, bar code scanners rely on price information maintained within a price-lookup (PLU) file. The PLU data file is typically stored in a single location at host server.

EPL systems typically include a plurality of EPLs for each merchandise item in a store. EPLs display the price of corresponding merchandise items on store shelves and are typically attached to a rail along the leading edge of the shelves. A store may contain thousands of EPLs to display the prices of the merchandise items. The EPLs are coupled to a central server from where information about the EPLs is typically maintained in an EPL data file. The EPL data file contains EPL identification information and EPL merchandise item information.

During management of prices in EPL systems, a situation may occur in which a customer sees a first price when viewing an EPL associated with an item, but sees a second price different from the first price when the item is scanned or recorded at the checkout counter. This situation occurs when the price of the item has been changed in the PLU file after the customer has viewed the EPL, but before the customer has checked out. This situation tends to occur most often in transaction establishments that regularly schedule price changes during peak shopping hours and in transaction establishments that have 24-hour shopping. The chance of this situation occurring increases with the length of time the consumer spends shopping in the transaction establishment.

Local state requirements mandate that there be at least some fraction of a minute delay between the time a price is changed and the time the new price is made available to checkout terminals. Additional delay may be necessary to increase the chance that consumers will purchase the item for the price they saw on the EPL.

While different methods of creating this delay already exist, they all entail suspending server processes for a given amount of time or creating additional processes which flow through lists containing PLU numbers, new prices, and times to apply the new prices. Both of these solutions negatively impact server performance.

Therefore, it would be desirable to provide a method of delaying availability of price changes to checkout terminals following EPL price changes which does not negatively impact server performance.

SUMMARY OF THE INVENTION

In accordance with the teachings of the present invention, a method of delaying availability of a price change to checkout terminals following a change in price displayed by an electronic price label (EPL) is provided.

The method includes the steps of storing a first time associated with the change in price displayed by the EPL, providing a price change file for changing the first price to the second price, reading the price change file to obtain a delay period, determining whether a current time is later than the first time plus the delay period, and executing the price change file if the current time is later than the first time plus the delay period to replace the first price with the second price.

If the current time is earlier than the first time plus the one delay period, then the method further includes the steps of determining a new delay period, creating a new price change file containing the new delay period, and executing the new price change file after the new delay period to replace the first price with the second price. Choices for the new delay period include the one delay period or the first time plus the one delay period less the current time.

The delay period may be greater for price increases then price decreases. As a further option, price decreases may have no delay at all.

If a price change file does not contain a delay, but should contain a delay, the method creates a new price change file containing the delay.

It is accordingly an object of the present invention to provide a method of delaying availability of price changes to checkout terminals following EPL price changes.

It is another object of the present invention to provide a method of delaying availability of price changes to checkout terminals following EPL price changes which uses a price change file containing delay information to execute price changes.

It is another object of the present invention to provide a method of delaying availability of price changes to checkout terminals following EPL price changes which does not require server shutdown.

It is another object of the present invention to provide a method of delaying availability of price changes to checkout terminals following EPL price changes which does not negatively impact server performance.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 1 is a block diagram of a transaction management system; and

FIG. 2 is a flow diagram illustrating the method of the present invention.

DETAILED DESCRIPTION OF THE PREFERRED EMBODIMENT

Referring now to FIG. 1, transaction system 10 primarily includes host computer system 12, point-of-service (POS) system 14, and electronic price label (EPL) system 16.

POS system 14 includes bar code scanner 18 and terminal 20.

EPL system 16 primarily includes EPLs 22, host EPL computer 24, and EPL storage medium 26.

EPLs 22 are typically attached to shelves within a store and include a data register 54 and a display 56. Data registers 54 contain data, usually the price of an item associated with an EPL on the shelves. The data is typically displayed by display 56.

Host EPL computer 24 executes EPL software 30, which maintains the contents of EPL data file 32. EPL software 30 records, schedules, and transmits all messages to EPLs 22. EPL software 30 additionally verifies that the price displayed by the EPL is the correct price by calculating a checksum from the correct price in PLU data file 44 and comparing the checksum to a checksum stored within EPL data file 32. If the checksums are not equal, then the EPL is not displaying the correct price because a price change message containing the correct price was not scheduled, transmitted, or received.

Host EPL computer 24 includes a real time clock and BIOS firmware which reports the current time to application programs that request it. PLU maintenance program 50 uses time reported by the BIOS firmware to determine whether a delay time recorded in PLU price change batch file 48 has been exceeded.

EPL data file 32 contains item information and EPL identification information for each of EPLs 22.

EPL storage medium 26 stores EPL data file 32 and is preferably a fixed disk drive.

Host computer system 12 includes storage medium 36, host computer 40, and input device 42.

Storage medium 36 stores PLU data file 44 and PLU price change batch file 48. PLU data file 44 is preferably the sole location for storing item prices and is available for distribution to POS terminal 20 by host computer 40. Alternatively, provision may be made for bar code scanner 18 to directly access PLU data file 44 from host computer 40.

PLU price change batch file 48 contains a new price for an item. If a delay is necessary, PLU price change batch file also contains a delay. The delay acts like a flag which tells PLU maintenance program 50 to postpone execution.

Here, computers 20, 24, and 40 are shown as separate components that are networked together, but they may also be combined in different ways. For example, EPL computer 24 and host computer 40 may be combined to form a single host computer. POS terminal 20 and host computer 40 may be combined to form a POS terminal which doubles as a host computer for a network of other POS terminals. Host computer system 12 may also be an in-store processor (ISP) or a remote computer system at a location where many stores are managed. In such a case, host computer system 12 maintains prices in PLU data file 44 and sends prices to EPL computer 24.

Host computer 40 executes PLU maintenance program 50. PLU maintenance program 50 updates PLU data file 44.

Input device 42 is preferably a keyboard.

PLU maintenance program 50 may send changes in price in PLU data file 44 directly to EPL computer 24 and POS terminal 20 as they are entered in input device 42 (immediate processing) or store price changes within PLU price change batch file 48 for later batch updating (batch processing). The present invention additionally uses batch processing to introduce a delay before execution of PLU price change batch file 48.

Turning now to FIG. 2, the operation of PLU maintenance program 50 is shown in more detail beginning with START 60.

In step 62, PLU maintenance program 50 sends a price change for an EPL to EPL computer 24. EPL computer 24 updates the checksum in EPL data file 32 and schedules a message for transmission to the EPL.

Additional small delays in scheduling or transmitting messages to EPLs are not a significant factor in determining overall delay EPL price change time and PLU price change time. If the planned delay is a little longer due to extra retry attempts to change an EPL price, it is still an acceptable amount of additional delay.

In step 64, PLU maintenance program 50 reads PLU price change batch file 48.

In step 66, PLU maintenance program 50 determines whether PLU price change batch file 48 contains a delay. If it does, operation proceeds to step 68. If it does not, operation proceeds to step 76.

The amount of delay is a system level option. The delay could be different for price changes that increase prices than for price changes that decrease prices. However, under these circumstances, all increases or decreases would have the same delay.

The delay can also vary from state to state. Under these circumstances, the system would subtract the time the EPL was updated from the current time, and ensure that the result was more than the predefined "necessary amount" of time (time in option file).

In step 68, PLU maintenance program 50 reads the delay and notes the current time.

In step 70, PLU maintenance program 50 determines whether the current time is late enough to begin execution of PLU price change batch file 48. If so, operation proceeds to step 80. If not, operation proceeds to step 72.

In step 72, PLU maintenance program 50 determines a new delay period that will cause the PLU price change time to meet or exceed the expiration time of the old delay period. Here, the new delay equals the EPL price change time plus the old delay period less the current time. Under these circumstances, the new delay period is less than the old delay period. Although it may be desirable to use a single delay period, using a single delay period adds extra delay be placing the PLU change time beyond the original time.

In step 74, PLU maintenance program 50 creates a new PLU price change batch file 48 containing the new delay and operation returns to step 64.

Returning to step 70, if the current time is late enough to begin execution of PLU price change batch file 48, PLU maintenance program 50 executes PLU price change batch file 48 in step 80 and operation ends at END 82.

Returning to step 66, if PLU price change batch file 48 does not contain a delay, PLU maintenance program 50 determines whether it should have a delay in step 76.

Optionally, PLU maintenance program 50 may only delay price increases. Both price increases and decreases are delayable, although retailers may choose to delay only price increases. For most retailers, the decision to delay a price change does not depend on PLU item, but on whether the price change is an increase or decrease.

Delayed batches are marked as such. If a batch comes in that is not "marked" as a delayed batch, then it's treated as a new batch in step 78 and then follows the typical price change rules. If it's a price increase, the PLU delay will be batched. If it's a decrease and decreases are delayed, then operation proceeds to step 78. If it's a decrease and decreases are not delayed, it will go straight to step 80 and update the PLU file.

From step 66, if PLU price change batch file 48 does not contain a delay, operation proceeds to step 80 to execute PLU price change batch file 48. If PLU price change batch file 48 does contain a delay, operation proceeds to step 78.

In step 78, PLU maintenance program 50 creates a new PLU price change batch file containing the appropriate delay and operation returns to step 62.

Advantageously, all of the information needed to change prices in PLU file 44 is preferably contained within PLU price change batch file 48. No additional lists or server overhead is required besides execution of file 48. Also, server processes need not be suspended.

Although the present invention has been described with particular reference to certain preferred embodiments thereof, variations and modifications of the present invention can be effected within the spirit and scope of the following claims.

What is claimed is:

1. A method of delaying replacement of a first price of an item with a second price of a item in a price file following a change in price displayed by an electronic price label (EPL) comprising the steps of:

storing a first time associated with the change in price displayed by the EPL;

providing a price change file for changing the first price to the second price;

reading the price change file to obtain a delay period;

determining whether a current time is later than the first time plus the delay period; and executing the price change file if the current time is later than the first time plus the delay period to replace the first price with the second price.

2. The method as recited in claim 1, further comprising the steps of:

determining a new delay period if the current time is earlier than the first time plus the delay period;

creating a new price change file containing the new delay period; and executing the new price change file after the new delay period to replace the first price with the second price.

3. The method as recited in claim 2, wherein the new delay period is equal to the delay period.

4. The method as recited in claim 2, wherein the new delay period is equal to the first time plus the one delay period less the current time.

5. The method as recited in claim 1, further comprising the steps of:

determining whether the second price is greater than the first price after the step of reading if the price change file contains the delay period;

if the second price is less than the first price,
      executing the price change file without delay; and if the second price is greater than the first price,
      providing another price change file with the delay period; and
      executing the other price change file if the current time is later than the first time plus the delay period to replace the first price with the second price.

6. The method as recited in claim 1, wherein the step of creating comprises the substeps of:

recording a first delay period as the delay period if the second price is greater than the first price; and recording a second delay period as the delay period if the second price is less than the first price.

7. A method of delaying replacement of a first price of an item with a second price of a item in a price file following a change in price displayed by an electronic price label (EPL) comprising the steps of:

storing a first time associated with the change in price displayed by the EPL;

providing a price change file for changing the first price to the second price and containing a delay period;

reading the price change file to obtain the delay period;

determining whether a current time is later than the first time plus the delay period;

executing the price change file if the current time is later than the first time plus the delay period to replace the first price with the second price;

determining a new delay period if the current time is earlier than the first time plus the delay period;

creating a new price change file containing the new delay period; and executing the new price change file after the new delay period to replace the first price with the second price.

8. A method of delaying replacement of a first price of an item with a second price of a item in a price file following a change in price displayed by an electronic price label (EPL) comprising the steps of:

storing a first time associated with the change in price displayed by the EPL;

providing a price change file for changing the first price to the second price, including the substep of storing a delay period in the price change file if the second price is greater than the first price;

reading the price change file to determine whether the price change file contains the delay period;

if the price change file contains the delay period,
      executing the price change file if the current time is later than the first time plus the delay period to replace the first price with the second price; and if the price change file does not contain the delay period,
      determining whether the second price is greater than the first price;
      if the second price is less than the first price, executing the price change file without delay to replace the first price with the second price; and
      if the second price is greater than the first price, providing another price change file with the delay period, and executing the other price change file if the current time is later than the first time plus the delay period to replace the first price with the second price.

* * * * *